United States Patent
Yamamoto et al.

(10) Patent No.: US 6,875,408 B1
(45) Date of Patent: Apr. 5, 2005

(54) EXHAUST GAS PURIFICATION CATALYST FOR INTERNAL COMBUSTION

(75) Inventors: Kosei Yamamoto, Hamamatsu (JP); Nobutoshi Konagai, Hamamatsu (JP); Fumikazu Kimata, Hamamatsu (JP); Ruri Higuchi, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 828 days.

(21) Appl. No.: 09/714,586

(22) Filed: Nov. 16, 2000

(30) Foreign Application Priority Data

Nov. 19, 1999 (JP) .......................................... 11/329032

(51) Int. Cl.⁷ .......................... B01D 53/94; B01J 23/10; B01J 23/56; B01J 23/76
(52) U.S. Cl. ....................... 422/180; 422/177; 502/304; 502/326; 502/327
(58) Field of Search ................................ 422/171, 177, 422/180, 174; 60/299, 300; 502/302–304, 326–327

(56) References Cited

U.S. PATENT DOCUMENTS

| | | | | | |
|---|---|---|---|---|---|
| 5,057,483 | A | * | 10/1991 | Wan | 502/304 |
| 5,151,254 | A | * | 9/1992 | Arai et al. | 422/180 |
| 5,674,461 | A | * | 10/1997 | Kato et al. | 422/179 |
| 6,090,744 | A | * | 7/2000 | Koda et al. | 502/304 |
| 6,596,243 | B1 | * | 7/2003 | Fujii et al. | 422/177 |

FOREIGN PATENT DOCUMENTS

| DE | 197 13 103 | * 10/1997 |
|---|---|---|
| EP | 813899 | * 12/1997 |
| JP | 3-157143 | 7/1991 |
| JP | 10-5603 | 1/1998 |

* cited by examiner

*Primary Examiner*—Hien Tran
(74) *Attorney, Agent, or Firm*—Alston & Bird LLP

(57) ABSTRACT

An object of the present invention is to provide an exhaust gas purification catalyst which can minimize the separation of the catalyst layer due to heat and vibration, can suppress thermal deterioration of the catalytic substance, and can exhibit excellent purification capabilities under severe conditions. Specifically, the present invention relates to an exhaust gas purification catalyst wherein an undercoat layer comprising a heat-resistant inorganic oxide having an oxygen-absorbing substance added thereto is formed on a surface of a metallic carrier, and a catalyst-carrying layer is formed on the undercoat layer.

12 Claims, 1 Drawing Sheet

EXHAUST GAS PURIFICATION CATALYST FOR INTERNAL COMBUSTION

BACKGROUND OF THE INVENTION

1. Field of the Invention

This invention relates to exhaust gas purification catalysts for internal combustion engine, and more particularly to an exhaust gas purification catalyst which has excellent thermal resistance and adhesion properties, can suppress thermal deterioration even under severe conditions, and can exhibit excellent purification capabilities.

2. Description of the Related Art

In two-wheeled motor vehicles, four-wheeled motor vehicles and the like, an exhaust gas purification catalyst is installed in the exhaust gas flow path so as to reduce the contents of carbon monoxide (CO) and hydrocarbons (HC) in exhaust gas from the internal combustion engine. As a conventional exhaust gas purification catalyst for two-wheeled motor vehicles, there is commonly used a ternary catalyst comprising a metallic carrier made of heat-resisting stainless steel and coated with a catalytic substance comprising noble metals.

In the exhaust pipe of a two-wheeled motor vehicle, the exhaust gas temperature is about 400° C. prior to the catalyst, but reaches 700–800° C. on the carrier region having a noble metal catalyst supported thereon owing to the chemical reactions taking place on the catalyst. Consequently, the catalyst has a shortcoming in that thermal expansion of the metallic carrier may cause the catalyst layer to become separated and, therefore, satisfactory purification capabilities cannot be achieved.

In order to overcome this shortcoming, there has been proposed a catalyst made by heat-treating a ferritic stainless steel material containing aluminum at a high temperature to produce alumina whiskers on a surface of the steel material, and depositing a catalytic substance thereon (Japanese Patent Provisional Publication No. 3-157143/1991). However, the type of the material is restricted in order to produce whiskers of good shape, and this catalyst is too expensive for practical use in two-wheeled motor vehicles.

In addition, there is known a catalyst in which a coating layer of a heat-resistant inorganic oxide is formed on a surface of a metallic carrier (Japanese Patent Provisional Publication No. 10-5603/1998). This catalyst can suppress the separation of the catalyst layer, but has the disadvantage of being unable to suppress deterioration of the catalytic substance under high-temperature conditions ranging from 700° C. to 800° C.

SUMMARY OF THE INVENTION

An object of the present invention is to provide an exhaust gas purification catalyst which can minimize the separation of the catalyst layer due to heat and vibrations, can suppress thermal deterioration of the catalytic substance, and can exhibit excellent purification capabilities under severe conditions.

The present invention relates to an exhaust gas purification catalyst having a metallic carrier and a catalyst-carrying layer wherein an undercoat layer comprising a heat-resistant inorganic oxide having an oxygen-absorbing substance added thereto is formed on a surface of the metallic carrier, and the catalyst-carrying layer is formed on the undercoat layer.

When a metallic carrier is used in exhaust gas purification catalysts for two-wheeled and four-wheeled motor vehicles, the catalyst layer may be separated owing to thermal expansion, vibration or the like. In order to improve its adhesion, the use of an undercoat layer comprising a heat-resistant inorganic oxide has been proposed (Japanese Patent Provisional Publication No. 10-5603/1998). This can suppress the separation of the catalyst layer, but fails to suppress a reduction in purification capabilities after an endurance treatment.

According to the present invention, an oxygen-absorbing substance (ceria or a double oxide of cerium and zirconium) is added to the heat-resistant inorganic oxide constituting the undercoat layer. This makes it possible to suppress a reduction in purification capabilities after an endurance treatment, while maintaining excellent adhesion properties. The reason for this is that, in contrast to conventional catalysts in which cerium oxide and a catalytic noble metal (i.e., rhodium) form a complex to cause a reduction in purification capabilities, the catalyst of the present invention permits cerium oxide in the undercoat layer to maintain its high oxygen-absorbing ability even after an endurance treatment.

According to the present invention, the formation of an undercoat layer comprising a heat-resistant inorganic oxide improves the adhesion between the metallic carrier and the catalyst-carrying layer and thereby minimizes the separation of the catalytic substance due to thermal expansion or vibration of the metallic carrier.

Moreover, the addition of an oxygen-absorbing substance to the undercoat layer comprising the heat-resistant inorganic oxide can prevent the oxygen-absorbing substance from forming a complex with a noble metal, and can thereby suppress a reduction in oxygen-absorbing ability and deterioration of the noble metal. In addition, an improvement in oxygen-absorbing ability suppresses the sintering of the noble metals and yields a catalyst having an excellent low-temperature activity.

Furthermore, the ternary catalysts used in four-wheeled motor vehicles exhibit the most excellent purification capabilities in the vicinity of the theoretical air-fuel ratio. Consequently, if the oxygen-absorbing ability is improved, the range of the air-fuel ratio in which high purification capabilities are obtained can be extended. Thus, the present invention makes it possible to achieve excellent purification capabilities.

DETAILED DESCRIPTION OF THE PREFERRED EMBODIMENTS

Figure 1:
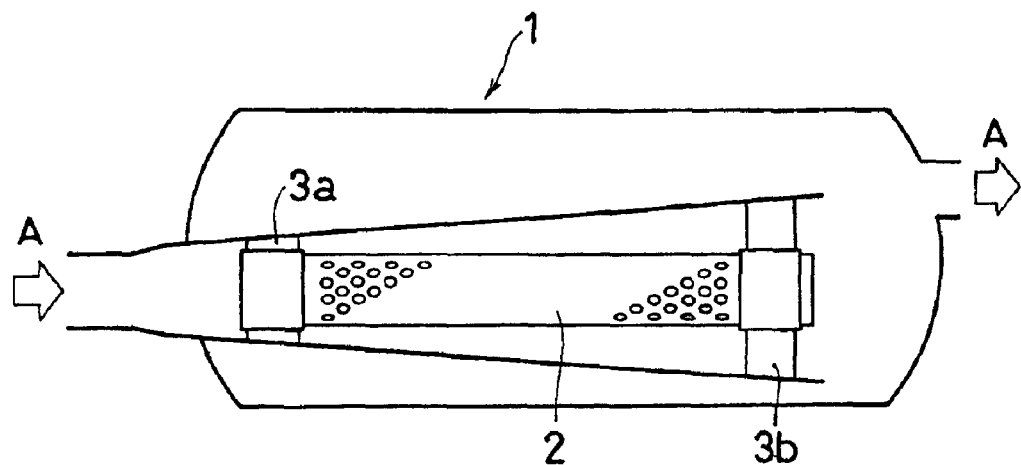
FIG. 1 is a schematic view of an exhaust gas purification catalyst installed within an exhaust pipe.

The metallic carrier used in the present invention comprises SUS430, SUS304, SUS316, SUS436 or the like, and may have any of various shapes such as platelike, cylindrical and honeycomb shapes. Preferred examples of the carrier are cylindrical punching metals made of heat-resisting stainless steel and known as punching pipes or punching tubes. These carriers are suitable for use in two-wheeled vehicles because not only they have improved heat resistance, but also the perforations made by punching provide a large surface area to improve exhaust gas purification capabilities, and cause a reduction in exhaust resistance within the exhaust pipe.

The heat-resistant inorganic oxide used in the present invention has excellent adhesion properties to metals, and functions as an adhesive for bonding a catalyst-carrying layer to the metallic carrier, so that the catalyst-carrying layer is attached to the carrier with a high bonding strength. This minimizes the amount of the catalytic substance which is separated and removed from the catalyst-carrying layer owing to thermal expansion or vibration of the carrier. Moreover, the formation of an undercoat layer comprising the heat-resistant inorganic oxide not only improves the thermal resistance of the carrier, but also protects the carrier from strong acids and chloride ion to improve its corrosion resistance and oxidation resistance and hence its durability.

The heat-resistant inorganic oxide may be any inorganic oxide that can withstand the temperature of exhaust gas from the internal combustion engine of motor vehicles and the like. However, since alumina, silica, aluminum silicate and alkali metal silicates have a high adhesion strength to metallic surfaces, an inorganic oxide comprising one or more compounds selected from among them provides a high bonding strength and hence functions properly as an adhesive for bonding the catalyst-carrying layer to the carrier.

The oxygen-absorbing substance used in the present invention, which is added to the undercoat layer comprising the heat-resistant inorganic oxide, improves the thermal resistance of the catalyst and permits the catalyst to exhibit excellent purification capabilities even under severe thermal conditions. Usually, if an oxygen-absorbing substance ceria ($CeO_2$) and a noble metal rhodium (Rh) coexist together, they form a complex at high temperatures to cause a reduction in the activity of rhodium and in the oxygen-absorbing ability of ceria. However, when added to the undercoat layer comprising the heat-resistant inorganic oxide, ceria does not form a complex with rhodium and can hence retain its excellent oxygen-absorbing ability. In particular, its effect can be enhanced in two-wheeled motor vehicles having a fuel-rich atmosphere which tends to deteriorate both rhodium and ceria severely.

In place of ceria ($CeO_2$), a double oxide of cerium and zirconium [$(Ce/Zr)O_2$] or the like may be used as the oxygen-absorbing substance to obtain a similar effect. The double oxide of cerium and zirconium may be prepared by effecting a reaction for forming a precipitate from an aqueous solution containing cerium and zirconium in a molar ratio ranging from 90/10 to 50/50.

If the oxygen-absorbing ability is improved, the sintering of the noble metals is suppressed to minimize a reduction in catalytic activity. Moreover, the light-off temperature (i.e., the temperature at which the catalyst becomes active) can be lowered to yield a catalyst having an excellent low-temperature activity.

Furthermore, the ternary catalysts used in four-wheeled motor vehicles exhibit the most excellent purification capabilities in the vicinity of the theoretical air-fuel ratio. Consequently, if the oxygen-absorbing ability is improved, the range of the air-fuel ratio in which high purification capabilities are obtained can be extended. Thus, the catalyst of the present invention exhibits excellent purification capabilities when used as a catalyst in four-wheeled-motor vehicles.

The mixing weight ratio of the oxygen-absorbing substance to the heat-resistant inorganic oxide is preferably in the range of 5/95 to 20/80.

The catalyst-carrying layer used in the present invention is desirably formed so as to comprise one or more noble metals selected from the group consisting of platinum (Pt), palladium (Pd) and rhodium (Rh), and a metallic oxide comprising chiefly of activated alumina.

The amount of noble metals (e.g., platinum) supported thereon is preferably not less than 2 g per unit area (1 $m^2$).

An exemplary application of the exhaust gas purification catalyst of the present invention is illustrated in FIG. 1. Specifically, in an exhaust pipe 1 connected with an exhaust port of an engine mounted in a two-wheeled motor vehicle, supporting members 3a and 3b are provided on the upstream and downstream sides of a flow path of exhaust gas A flowing in the direction of an arrow, and an exhaust gas purification catalyst 2 is attached thereto.

Figure 2:
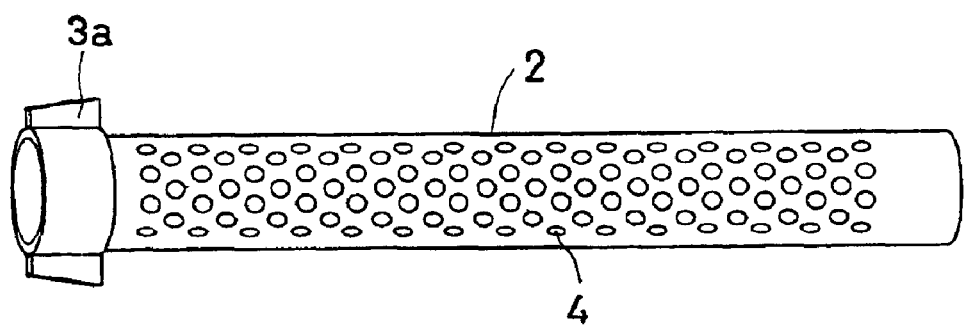
FIG. 2 is a perspective view of an exhaust gas purification catalyst in the form of a punching metal.

FIG. 2 illustrates an embodiment of the exhaust gas purification catalyst 2 in which a cylinder formed of a platelike punching metal having a multitude of perforations 4 is used as the carrier.

Figure 3:
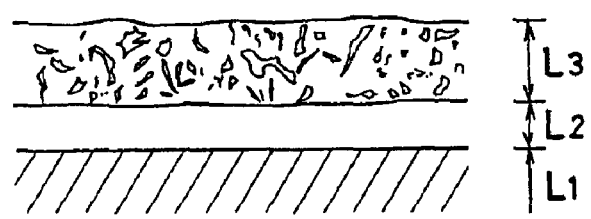
FIG. 3 is a cross-sectional view of a pipe catalyst having a catalyst layer supported thereon.

FIG. 3 illustrates a cross section of a pipe catalyst having a catalyst layer supported thereon. An undercoat layer L2 comprising a heat-resistant inorganic oxide is formed on a carrier L1 made of heat-resisting stainless steel, and a catalyst-carrying layer L3 is formed on the undercoat layer L2. The undercoat layer L2 preferably has a thickness of 0.01 to 0.05 mm, and the catalyst-carrying layer L3 preferably has a thickness of 0.05 to 0.1 mm. Thicknesses outside their respective ranges may be disadvantageous in that unduly small thicknesses may fail to provide satisfactory catalyst performance and unduly large thicknesses may cause separation of the catalyst layer.

Now, the method of making the exhaust gas purification catalyst of the present invention is described below.

A metallic carrier is soaked in a slurry of a heat-resistant inorganic oxide having an oxygen-absorbing substance added thereto, taken out of it, and dried to form a layer of the heat-resistant inorganic oxide containing the oxygen-absorbing substance (i.e., an undercoat layer) on a surface of the carrier. Subsequently, the carrier is soaked in a slurry containing principally activated alumina, taken out of it, dried to form a catalyst-carrying layer comprising chiefly of activated alumina, and then fired, for example, at 400–500° C. for 1–3 hours. Thereafter, the carrier is soaked in a nitric acid solution containing platinum, rhodium and the like, taken out of it, dried, and then fired, for example, at 150–250° C. for 1 hour.

The present invention is more specifically explained with reference to the following example and comparative example. However, it is to be understood that the present invention is not limited thereto.

EXAMPLE 1

A punching pipe (with an outer diameter of 22 mm and a length of 80 mm) made of stainless steel (SUS430) was used as a catalyst carrier. This carrier was soaked in a slurry of a heat-resistant inorganic oxide (composed chiefly of alumina) having ceria added thereto, taken out of it, and dried in hot air to form an undercoat layer of alumina containing ceria on a surface of the carrier. Subsequently, a catalyst-carrying layer consisting chiefly of activated alumina was formed on the undercoat layer in the same manner as described above for the formation of the undercoat layer, and then fired at 500° C. for 3 hours. Thereafter, the carrier was soaked in a nitric acid solution containing platinum (Pt) and rhodium (Rh), taken out of it, dried to impregnate the catalyst-carrying layer with platinum and rhodium, and then fired at 200° C. for 1 hour. Thus, exhaust gas purification catalyst A was obtained.

COMPARATIVE EXAMPLE 1

An undercoat layer was formed on a carrier in the same manner as in Example 1, except that the slurry of the heat-resistant inorganic oxide having ceria added thereto was replaced by a slurry of the ceria-free heat-resistant inorganic oxide alone. Subsequently, according to the same procedure as employed in Example 1, a catalyst-carrying layer was formed thereon and impregnated with noble metals. Thus, exhaust gas purification catalyst B was obtained.

Evaluation Test 1 (Evaluation Test with a Model Gas)

The aforesaid catalyst A (with ceria) and catalyst B (without ceria) were subjected to a thermal endurance treatment by heating them in an oven at 800° C. for 20 hours. The purification capabilities of catalysts A and B were measured before and after the endurance treatment. Thus, the thermal resistance of each catalyst was evaluated by examining the degree of reduction in purification capabilities after the endurance treatment.

The method of evaluation was as follows. A model gas simulating exhaust gas from a two-stroke engine was produced by a model gas testing apparatus, and passed through each catalyst. By analyzing the composition of the gas on the upstream and downstream sides of the catalyst, the degree of reduction in the contents of regulated substances (i.e., hydrocarbons (HC) and carbon monoxide (CO)) in the gas (i.e., the degree of purification) was determined. The composition of the model gas used is shown in Table 1.

TABLE 1

Composition of synthesized model gas

| CO | $O_2$ | $CO_2$ | $H_2O$ | $SO_2$ | $NO_x$ | $H_2$ | HC | $N_2$ |
|---|---|---|---|---|---|---|---|---|
| 1% | 1.3% | 3.8% | 10% | 20 ppm | 280 ppm | 3500 ppm | 4000 ppm | Balance |

Gas temperature: 450 ± 5° C.; gas flow rate: 20 L/min.

The results of the test with the model gas are shown in Table 2. It can be seen from these results that the reduction in the purification capabilities of catalyst A (with ceria) after the endurance treatment was suppressed as compared with catalyst B (without ceria) and, therefore, catalyst A had more excellent thermal resistance than catalyst B.

TABLE 2

Results of test with model gas

| | A (with ceria) | | B (without ceria) | |
|---|---|---|---|---|
| | Before endurance treatment | After endurance treatment | Before endurance treatment | After endurance treatment |
| Degree of purification for CO | 25.6% | 21.0% | 25.2% | 16.7% |
| Degree of purification for HC | 20.3% | 16.4% | 19.9% | 11.7% |

Endurance treatment conditions: 800° C. × 20 hr in an oven.

Evaluation Test 2 (Evaluation Test with Actual Exhaust Gas)

According to the same procedure as employed in Evaluation Test 1, catalysts A and B were subjected to a thermal endurance treatment, and their degrees of purification were measured before and after the endurance treatment. In this example, however, evaluation was carried out by using actual exhaust gas from a four-stroke engine as the evaluation gas.

The test conditions were as follows.
Engine: Four-stroke engine with a displacement of 1.6 liters
Exhaust gas temperature: 460° C.
SV (Space Velocity): 77,000 $h^{-1}$
A/F (Air/Fuel Ratio); 14.6±0.5

The results of the test with actual exhaust gas are shown in Table 3. Similarly to Evaluation Test 1, the test with exhaust gas from a four-stroke engine revealed that catalyst A had more excellent thermal resistance than catalyst B.

TABLE 3

Results of test with actual exhaust gas

| | A (with ceria) | | B (without ceria) | |
|---|---|---|---|---|
| | Before endurance treatment | After endurance treatment | Before endurance treatment | After endurance treatment |
| Degree of purification for CO | 20.9% | 13.4% | 21.2% | 10.9% |
| Degree of purification for HC | 18.1% | 11.7% | 17.8% | 9.6% |

Endurance treatment conditions: 800° C. × 20 hr in an oven.

Evaluation Test 3 (Light-Off Test)

By using actual exhaust gas from a four-stroke engine in the same manner as in Evaluation Test 2, the light-oft temperature (i.e., the temperature at which the catalyst becomes active) was measured. In the light-off test, the purification capabilities of a catalyst were measured while the exhaust gas temperature was being raised by means of a heat exchanger installed between the engine and the catalyst. The temperature at which the catalyst became active) was regarded as the light-off temperature. The space velocity and A/F were the same as employed in Evaluation Test 2.

The results of the light-off test are shown in Table 4. Before the thermal endurance treatment, catalysts A and B had the same light-off temperatures. After the thermal endurance treatment, however, catalyst A (with ceria) became active at a temperature which was about 15° C. lower than that for catalyst B (without ceria), indicating that catalyst A had more excellent light-off performance than catalyst B.

TABLE 4

Results of light-off test (light-off temperatures)

| | A (with ceria) | | B (without ceria) | |
|---|---|---|---|---|
| | Before endurance treatment | After endurance treatment | Before endurance treatment | After endurance treatment |
| Evaluation by the degree of purification for CO | 345° C. | 420° C. | 345° C. | 435° C. |
| Evaluation by the degree of purification for HC | 350° C. | 430° C. | 350° C. | 446° C. |

Endurance treatment conditions: 800° C. × 20 hr in an oven.

What is claimed is:

1. An exhaust gas purification catalyst comprising a metallic carrier, an undercoat layer disposed on a surface of said carrier, said undercoat layer comprising a heat-resistant inorganic oxide having an oxygen-absorbing substance added thereto and characterized by the absence of a noble metal, and a catalyst-carrying layer disposed on said undercoat layer and having a catalyst supported thereon.

2. An exhaust gas purification catalyst as claimed in claim 1 wherein said carrier comprises a cylindrical punching metal made of heat-resisting stainless steel.

3. An exhaust gas purification catalyst as claimed in claim 1 wherein said oxygen-absorbing substance comprises cerium oxide or a double oxide of cerium and zirconium.

4. An exhaust gas purification catalyst as claimed in claim 1 wherein said heat-resistant inorganic oxide comprises one or more compounds selected from the group consisting of alumina, silica, aluminum silicate and alkali metal silicates.

5. An exhaust gas purification catalyst as claimed in claim 1 wherein said catalyst-carrying layer comprises one or more noble metals selected from the group consisting of platinum, palladium and rhodium, and a metallic oxide comprising activated alumina.

6. An exhaust gas purification catalyst as claimed in claim 1, wherein said undercoat layer consists essentially of:

at least one oxygen-absorbing substance selected from the group consisting of cerium oxide and a double oxide of cerium and zirconium; and at least one heat-resistant inorganic oxide selected from the group consisting of alumina, silica, aluminum silicate and alkali metal silicates.

7. A two-wheeled or four-wheeled motor vehicle comprising:

an exhaust gas discharge system using an exhaust gas purification catalyst, wherein the exhaust gas purification catalyst comprising comprise a metallic carrier, an undercoat layer disposed on a surface of said carrier and comprising a heat-resistant inorganic oxide having an oxygen-absorbing substance added thereto and characterized by the absence of a noble metal, and a catalyst-carrying layer disposed on said undercoat layer and having a catalyst supported thereon.

8. A vehicle as claimed in claim 7, wherein said carrier comprises a cylindrical punching metal made of heat-resisting stainless steel.

9. A vehicle as claimed in claim 7, wherein said oxygen-absorbing substance comprises cerium oxide or a double oxide of cerium and zirconium.

10. A vehicle as claimed in claim 7, wherein said heat-resistant inorganic oxide comprises one or more compounds selected from the group consisting of alumina, silica, aluminum silicate and alkali metal silicates.

11. A vehicle as claimed in claim 7, wherein said catalyst-carrying layer comprises one or more noble metals selected front the group consisting of platinum, palladium and rhodium, and a metallic oxide comprising activated alumina.

12. A vehicle as claimed in claim 7, wherein said undercoat layer consists essentially of at least one oxygen absorbing substance selected from the group consisting of cerium oxide and a double oxide of curium and zirconium; and at least one heat-resistant inorganic oxide selected from the group consisting of alumina, silica, aluminum silicate and alkali metal silicates.

\* \* \* \* \*

UNITED STATES PATENT AND TRADEMARK OFFICE
CERTIFICATE OF CORRECTION

PATENT NO. : 6,875,408 B1  
DATED : April 5, 2005  
INVENTOR(S) : Yamamoto et al.

It is certified that error appears in the above-identified patent and that said Letters Patent is hereby corrected as shown below:

Column 7,  
Line 28, "comprising comprise" should read -- comprises --.

Signed and Sealed this

Fifth Day of July, 2005

JON W. DUDAS  
*Director of the United States Patent and Trademark Office*